(12) United States Patent
Shenouda

(10) Patent No.: US 12,000,758 B2
(45) Date of Patent: Jun. 4, 2024

(54) LEAK DETECTION FOR PRESSURIZED FLUID SYSTEMS

(71) Applicant: Pratt & Whitney Canada Corp., Longueuil (CA)

(72) Inventor: Antwan Shenouda, Mississauga (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 423 days.

(21) Appl. No.: 17/343,705

(22) Filed: Jun. 9, 2021

(65) Prior Publication Data
US 2022/0397478 A1   Dec. 15, 2022

(51) Int. Cl.
*G01M 3/26* (2006.01)
*B64D 37/32* (2006.01)

(52) U.S. Cl.
CPC ............... *G01M 3/26* (2013.01); *B64D 37/32* (2013.01)

(58) Field of Classification Search
CPC ................................. G01M 3/26; B64D 37/32
USPC ........................................................ 701/100
See application file for complete search history.

(56) References Cited

U.S. PATENT DOCUMENTS

| 8,079,220 | B2 | 12/2011 | Haggerty |
| 9,347,377 | B2 | 5/2016 | Murakami et al. |
| 9,506,835 | B2 | 11/2016 | Konatham et al. |
| 10,101,238 | B2 | 10/2018 | Bermudez et al. |
| 10,260,425 | B2 | 4/2019 | Crowley et al. |
| 2012/0048000 | A1 | 3/2012 | Kirzhner |
| 2020/0173366 | A1 | 6/2020 | Akana et al. |
| 2020/0262578 | A1 | 8/2020 | Viscotchi et al. |
| 2020/0355372 | A1 | 11/2020 | Onishi et al. |
| 2022/0397479 | A1* | 12/2022 | Shenouda ................. F02C 3/22 |

FOREIGN PATENT DOCUMENTS

| DE | 102018113092 | 11/2019 | |
| JP | 2015078838 A | * 4/2015 | |
| WO | WO-2018227284 A1 | * 12/2018 | .......... F16L 55/1022 |

OTHER PUBLICATIONS

WO-2018227284-A1 (Oliveira et al.) (Dec. 20, 2018) (Machine Translation) (Year: 2018).*

* cited by examiner

*Primary Examiner* — Mahmoud Gimie
(74) *Attorney, Agent, or Firm* — NORTON ROSE FULBRIGHT CANADA LLP

(57) ABSTRACT

In accordance with at least one aspect of this disclosure, a fluid system of an aircraft includes a primary fluid conduit that conveys a primary fluid, and a leak detection system disposed around at least a portion of the primary fluid conduit and forming one or more detection volumes. The leak detection system determines whether there is a primary fluid leak into the one or more detection volumes by sensing a pressure change in the one or more detection volumes.

20 Claims, 7 Drawing Sheets

LEAK DETECTION FOR PRESSURIZED FLUID SYSTEMS

FIELD

This disclosure relates to pressurized fluid systems. There is always a need in the art for improvements to pressurized fluid systems (e.g., fuel systems) in the aerospace industry.

SUMMARY

In accordance with at least one aspect of this disclosure, a fluid system of an aircraft includes a primary fluid conduit that conveys a primary fluid, and a leak detection system disposed around at least a portion of the primary fluid conduit and forming one or more detection volumes. The leak detection system determines whether there is a primary fluid leak into the one or more detection volumes by sensing a pressure change in the one or more detection volumes.

In certain embodiments, the leak detection system includes one or more housings defining the one or more detection volumes, and one or more pressure sensors operatively connected to the one or more of the one or more housings to sense a pressure within a respective detection volume, within a plurality of detection volumes, or within all of the one or more detection volumes. In certain embodiments, the one or more detection volumes includes a first detection volume, and the one or more housings include a first housing disposed around an interface of the fluid conduit. In certain embodiments, the first housing surrounds an entirety of a first primary fluid line of the primary fluid conduit between a first primary fluid system component and a second primary fluid system component to form a first detection volume.

In certain embodiments, the first housing is sealed to the first primary system component and to the second primary system component to encompass a first connection and second connection of the first primary fluid line within the one or more detection volumes. In certain embodiments, the one or more housings include a first housing disposed around a first primary fluid line of the primary fluid conduit between a first primary fluid system component and a second primary fluid system component to form a first detection volume. In certain embodiments, the one or more housings include a second housing disposed around a second primary fluid line of the primary fluid conduit between the second primary fluid system component and a third primary fluid system component to form a second detection volume. In certain embodiments, the second housing is sealed to the second primary system component and to the third primary system component to encompass a first connection and second connection of the second primary fluid line within the one or more detection volumes.

In certain embodiments, the first detection volume and the second detection volume are fluidly isolated from each other. In certain embodiments, the one or more pressure sensors includes at least one pressure sensor for each detection volume.

In certain embodiments, the system includes a bypass line fluidly connecting the first housing and the second housing such that first detection volume and the second detection volume are fluidly connected. In certain embodiments, the one or more pressure sensors is a single pressure sensor.

In certain embodiments, the one or more housings include a single housing that surrounds one or more primary fluid system components of the primary fluid conduit. In certain embodiments, the single housing surrounds all primary fluid system components and all primary fluid lines.

In certain embodiments, the system can include a control system operatively connected to the one or more pressure sensors to determine whether there is a primary fluid leak based on pressure signals from the one or more pressure sensors. The control system can include any suitable computer hardware and/or software module(s) as appreciated by those having ordinary skill in the art.

In certain embodiments, the fluid system is a fuel system and the primary fluid is a fuel. In certain embodiments, the primary fluid is hydrogen. In certain embodiments, the system includes a pressurized secondary fluid filling the one or more detection volume at a lower pressure than an operating pressure of the primary fluid in the primary line.

In accordance with at least one aspect of this disclosure, an aircraft can include a fuel system that is the same as or similar to any suitable embodiment of a fluid system disclosed herein (e.g., described above). In the fuel system, the primary fluid is fuel, for example.

In accordance with at least one aspect of this disclosure, an aircraft engine includes one or more fuel components having a primary fluid conduit that conveys a primary fluid. In certain embodiments, the primary fluid is fuel. The aircraft engine can include a leak detection system as disclosed herein (e.g., as described above). Any other suitable engine components are contemplated herein.

In accordance with at least one aspect of this disclosure, a fluid system of an aircraft comprises a fluid conduit that conveys a primary fluid, the primary fluid being fuel, a housing disposed around at least a portion of the primary fluid conduit and forming a detection volume, and a pressure sensor disposed in operative communication with the housing to sense a pressure within the detection volume. The fluid system also includes a control system operatively connected to the pressure sensor to determine whether there is a primary fluid leak between the fluid conduit and the detection volume based on pressure signals from the pressure sensor.

In accordance with at least one aspect of this disclosure, a leak detection system includes a leak detection module that operatively connects to one or more pressure sensors to receive signals from the one or more pressure sensors that sense pressure of a secondary fluid in a detection volume, the leak detection module operable to execute a method. In certain embodiments, the method includes determining or receiving a detection volume pressure based on the signals from the one or more pressure sensors, comparing the detection volume pressure to a primary leak threshold, and outputting a primary fluid leak signal to indicate a primary fluid leak of a primary fluid between a primary fluid path and the detection volume when the detection volume pressure exceeds the primary leak threshold.

In certain embodiments, the method further includes monitoring the detection volume pressure after crossing the primary fluid leak threshold, and outputting a dual primary-secondary fluid leak signal indicating a secondary fluid leak in addition to the primary fluid leak if the detection volume pressure stabilizes below a primary fluid pressure threshold. In certain embodiments, the method further includes, monitoring the detection volume pressure after crossing the primary fluid leak threshold, and outputting a dual primary-secondary fluid leak signal indicating a secondary fluid leak in addition to the primary fluid leak if the detection volume pressure decreases after crossing the primary fluid leak threshold. In certain embodiments, the method further includes, monitoring the detection volume pressure after crossing the primary fluid leak threshold, and outputting a dual primary-secondary fluid leak signal indicating a secondary fluid leak in addition to the primary fluid leak if the detection volume pressure stabilizes above a primary fluid pressure threshold, and subsequently decreases below the primary fluid pressure threshold.

In certain embodiments, the method further includes comparing the detection volume pressure to a secondary leak threshold, and outputting a secondary fluid leak signal to indicate a secondary fluid leak between the detection volume and an atmosphere if the detection volume pressure declines below the secondary leak threshold. In certain embodiments, the method further includes monitoring the detection volume pressure after crossing the secondary fluid leak threshold, and outputting a dual primary-secondary fluid leak signal indicating a primary fluid leak in addition to the secondary fluid leak if the detection volume pressure stabilizes above an atmosphere pressure threshold. In certain embodiments, the method further includes monitoring the detection volume pressure after crossing the secondary fluid leak threshold, and outputting a dual primary-secondary fluid leak signal indicating a primary fluid leak in addition to the secondary fluid leak if the detection volume pressure increases after crossing the secondary fluid leak threshold.

In certain embodiments, the method further includes monitoring the detection volume pressure after crossing the secondary fluid leak threshold, and outputting a dual primary-secondary fluid leak signal indicating a primary fluid leak in addition to the secondary fluid leak if the detection volume pressure stabilizes below an atmosphere pressure threshold, and subsequently increases above the atmosphere pressure threshold.

In certain embodiments, the system can include an engine control module that controls an engine based on signals received from the leak detection module. In certain embodiments, the engine control module shutdowns the engine and/or a fuel system thereof if a dual primary-secondary fluid leak is detected.

In accordance with at least one aspect of this disclosure, a method for detecting a leak in a fuel system can include determining or receiving a detection volume pressure based on signals from one or more pressure sensors, comparing the detection volume pressure to a primary fluid leak threshold, and outputting a primary fluid leak signal to indicate a primary fluid leak of a primary fluid between a primary fluid path and the detection volume if the detection volume pressure exceeds the primary leak threshold. In certain embodiments, the method further includes monitoring the detection volume pressure after crossing the primary fluid leak threshold, and outputting a dual primary-secondary fluid leak signal indicating a secondary fluid leak in addition to the primary fluid leak if the detection volume pressure stabilizes below a primary fluid pressure threshold.

In accordance with at least one aspect of this disclosure, a method for leak detection of a fluid system includes pressurizing a primary fluid system to a primary fluid pressure, monitoring a detection volume pressure different from the primary fluid pressure, and if the detection volume pressure increases above a primary fluid leak threshold, outputting a primary fluid leak signal, and if the detection volume pressure decreases below a secondary fluid leak threshold, outputting a secondary fluid leak signal. In certain embodiments, the method further includes activating a maintenance indicator in response to the primary fluid leak signal alone or the secondary fluid leak signal alone.

In certain embodiments, the method further includes monitoring the detection volume pressure after outputting the primary fluid leak signal, and if the detection volume pressure decreases from a highest point, determining a dual secondary fluid leak also exists and shutting down the primary fluid system. In certain embodiments, the method further includes monitoring the detection volume pressure after outputting the primary fluid leak signal, and if the detection volume pressure stabilized below a primary fluid pressure threshold, determining a secondary fluid leak also exists and shutting down the primary fluid system.

In certain embodiments, the method further includes monitoring the detection volume pressure after outputting the secondary fluid leak signal, and if the detection volume pressure increases from a lowest point, determining a primary fluid leak also exists and shutting down the primary fluid system. In certain embodiments, the method further includes monitoring the detection volume pressure after outputting the secondary fluid leak signal, and if the detection volume pressure stabilizes above an atmosphere pressure threshold, determining a dual primary-secondary fluid leak exists and shutting down the primary fluid system.

In certain embodiments, the fluid system is a fuel system. In certain embodiments, the fuel system is a hydrogen fuel system for an aircraft. Any other suitable fluid system or fuel type system is contemplated herein.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
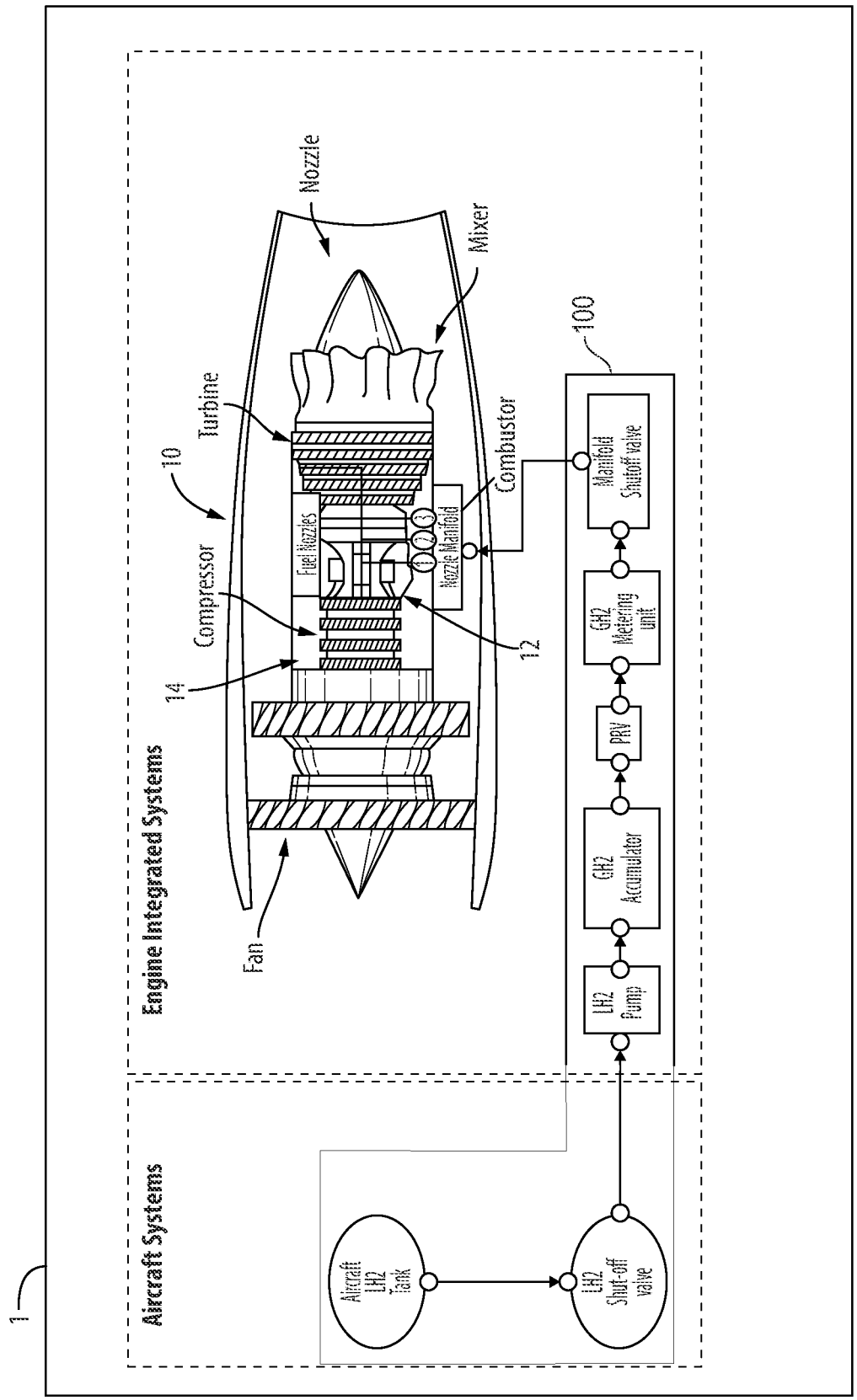
FIG. 1 is a schematic view of an embodiment of an aircraft in accordance with this disclosure.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other embodiments and/or aspects of this disclosure are shown in FIGS. 2-10.

In certain embodiments, referring to FIG. 1, an aircraft 1 can include an engine 10, where the engine can be a propulsive energy engine (e.g. creating thrust for the aircraft 1), or a non-propulsive energy engine. The engine can include a fluid system 100, configured to convey a primary fluid therethrough. In certain embodiments, the primary fluid is fuel. In certain embodiments, the primary fluid is hydrogen (e.g., liquid or gas). For example, the embodiment of a fluid system 100 shown in FIG. 1 is a high pressure hydrogen fuel system with plurality of fuel system components (e.g., a tank, a shut off valve, a pump, an accumulator, a pressure regulating valve (PRV), a metering unit, and a manifold shutoff valve, or any other suitable components or combination thereof).

In the present embodiment, the engine 10 is a turbofan engine, although the present technology may likewise be used with other engine types. The engine 10 includes a compressor 14 in a primary gas path 12 to supply compressed air to a combustor of the aircraft engine 10. The fluid system 100 can be or include any suitable embodiment of a fluid system disclosed herein below, e.g., fluid system 200, 300, 400, or 500 as described below. As shown in the embodiment of FIG. 1, the fluid system 100 is a fuel system that supplies fuel to the combustor through a nozzle manifold for mixture with the pressurized air and combustion within the combustor.

Figure 2:
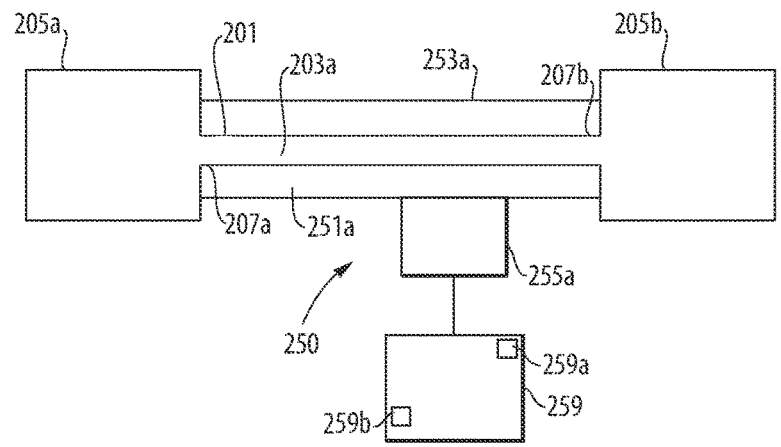
FIG. 2 is a schematic diagram of an embodiment of a system in accordance with this disclosure.

In accordance with at least one aspect of this disclosure, referring to FIG. 2, the fluid system 200 can include a primary fluid conduit 201 that conveys a primary fluid (e.g., a fuel or any other suitable pressurized fluid). The fluid system 200 can include a first primary fluid line 203a. A leak detection system 250 can be disposed around at least a portion of the primary fluid conduit 201 and forms one or more detection volumes (e.g., detection volume 251a). The leak detection system 250 can determine whether there is a primary fluid leak into the one or more detection volumes 251a by sensing a pressure change in the one or more detection volumes 251a. For example, the leak detection system 250 can include a housing 253a that defines a detection volume 251a, surrounding the first primary fluid line 203a. The one or more detection volumes 251a can be a sealed volume in certain embodiments, e.g., as shown, with no flow intended therein such that the one or more detection volumes 251a hold a static pressure.

Each sealed detection volume 251a can be pressurized with any suitable static pressurized fluid. For example, the static pressurized fluid can include air, inert gas, or any other suitable fluid and can fill the one or more detection volumes 251a at a lower pressure than an operating pressure of the primary fluid (e.g., hydrogen) in the primary fluid conduit 201 (to allow the primary fluid to leak into the one or more detection volumes and raise a pressure thereof to detect the leak). However, it is contemplated a higher pressure can be had in the detection volume 251a such that the static pressurized fluid is allowed to leak into the primary fluid conduit 201 to cause a drop in pressure, where a drop in pressure can be indicative of a leak between the primary fluid conduit 201 and the respective detection volume 251a (e.g., assuming no leak to the atmosphere).

While certain embodiments can have one or more detection volumes 251a that are sealed (e.g. holding a static fluid), certain embodiments can may be an unsealed volume (e.g., sweep structure where static pressure increase can be detected in flow). In certain embodiments, it is contemplated that the one or more detection volumes 251a may form a portion of any suitable secondary flow channel.

In certain embodiments, the one or more housings can be or include a first housing 253a disposed around a first primary fluid line 203a of the primary fluid conduit 201 between a first primary fluid system component 205a and a second primary fluid system component 205b to form a first detection volume 251a. In certain embodiments, the first housing 253a surrounds and entirety of a first primary fluid line 203a of the primary fluid conduit 201 between a first primary fluid system component 205a and a second primary fluid system component 205b to form a first detection volume 251a.

The housing 253a can be disposed between any suitable system components (e.g., system components 205a and 205b) in the first primary fluid line 203a. For example, the system components 205a, 205b can include a valve, a pump, a metering device, or any other suitable component (e.g., in a fuel system for example). In certain embodiments, the housing 253a is sealed to the first primary system component 205a (e.g., at a first end of the housing 253a) and to the second primary system component 205b (e.g., at a second end of the housing 253a) to encompass a first connection 207a and second connection 207b of the first portion of the first primary fluid line 203a within the interior detection volumes 251a.

The leak detection system 250 can include a pressure sensor 255a disposed in operative communication with the housing 253a to sense a pressure within the detection volume 251a, e.g., to sense changes in pressure within the detection volume 251a. The pressure sensor 255a can be used to determine whether there is a fluid leak between the primary fluid conduit 201 and the detection volume 251a by sensing a pressure change in the detection volume 251a. While a single housing 253a, detection volume 251a, and sensor 255a is shown in the embodiment of FIG. 2, it is contemplated herein that any suitable number of housings, detection volumes, and sensors is contemplated herein, for example as described further herein below with respect to systems 300, 400, and 500. Similarly, any suitable portion(s) of the fluid conduit (e.g., lines and or components) can be covered by any suitable number of housings and detection volumes.

In certain embodiments, a control system 259 is operatively connected to the pressure sensor 255a and includes a leak detection module 259a, to determine whether there is a fluid leak from (or into) the primary fluid conduit 201 based on pressure signals from pressure sensors 255a. For example, in certain embodiments, if the static pressure of the detection volume 251a increases above a predetermined threshold, the control system 259 will indicate there is a leak from at least the primary fluid conduit into the detection volume 251a. Also, in certain embodiments, if the static pressure of the detection volume 251a decreases below a predetermined threshold, the control system 259 will indicate there is at least a leak in the housing 253a such that fluid is escaping from the detection volume 251a to the atmosphere. Embodiments of control logic of the control system 259 are described further herein below (e.g., with respect to FIGS. 6-10).

In certain embodiments, the leak detection system can include an engine control module 259b operatively connected to the leak detection module 259a. The engine control module 259b can be part of or otherwise separate from the control system 259, similar to the leak detection module 259a. The engine control module 259b can control an engine (e.g., aircraft engine 10) based on signals received from the leak detection module 259a. In certain embodiments, the engine control module 259b shutdowns the engine and/or a fuel system thereof if a dual primary-secondary fluid leak is detected, for example. In certain embodiments, the engine control module 259b can continue to operate if only one leak type is detected, while sending a maintenance and/or warning signal (e.g., to a cockpit device).

The control system 259, the leak detection module 259a, the engine control module 259b, and any other module(s) disclosed herein can include any suitable computer hardware and/or software module(s) configured to execute a method (e.g., computer executable instructions stored on a non-transitory computer readable medium of the control system 259). Any suitable portion (e.g., all) of the leak detection module 259a and engine control module 259b can be hosted on the control system 259 and/or in any other suitable location in any suitable delineation.

Figure 3:
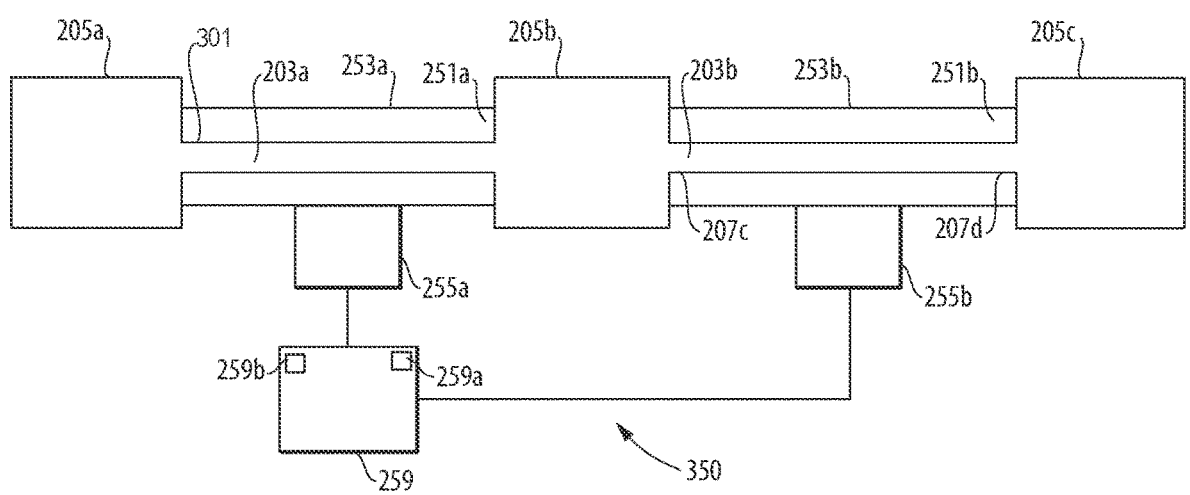
FIG. 3 is a schematic diagram of an embodiment of a system in accordance with this disclosure.

Referring to the system 300 of FIG. 3, in certain embodiments, a leak detection system 350 can be similar to that of leak detection system 250. For brevity, the description of common elements that have been described above are not repeated. In leak detection system 350, a second housing 253b can be disposed around a second primary fluid line 203b of the fluid conduit 301, forming a second detection volume 251b fluidly isolated from the fluid conduit 301. The second housing 253b can be sealed to the second primary system component 205b and to a third primary system component 205c to encompass a first connection 207c and second connection 207d of the second primary fluid pipe 203b within the detection volume 251b.

In certain embodiments, the pressure sensor 255a can include at least one pressure sensor 255a, 255b for each detection volume 251a, 251b. In certain embodiments, the pressures within the different detection volumes 251a, 251b can be different (e.g., due to different primary fluid pressure at different sections of the primary fluid conduit). However, in certain embodiments, pressure can be the same in different detection volumes.

Figure 4:
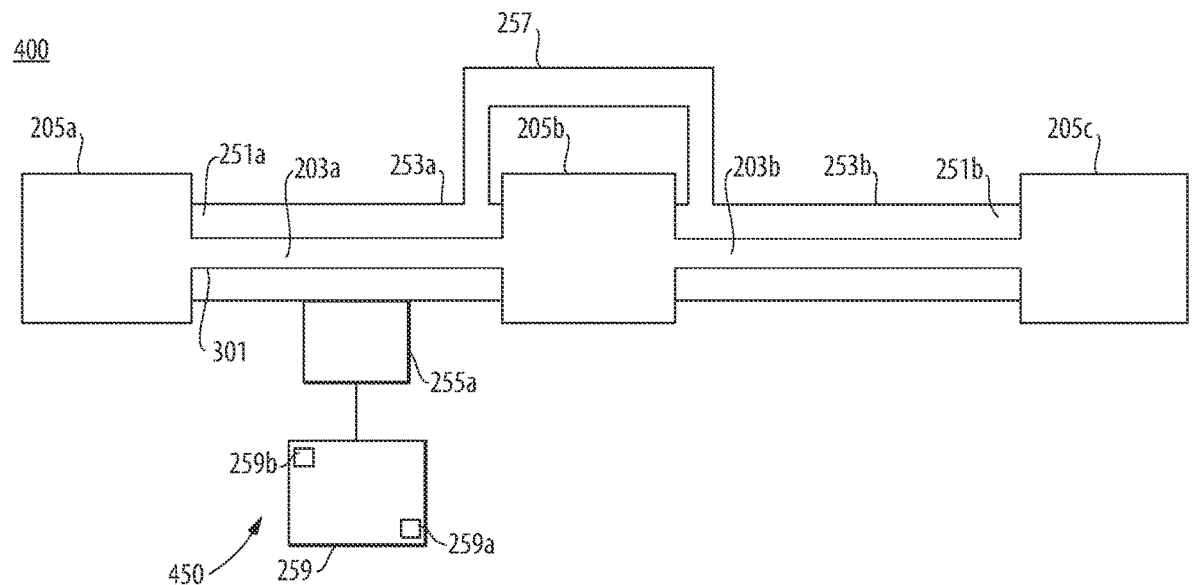
FIG. 4 is a schematic diagram of an embodiment of a system in accordance with this disclosure.

In certain embodiments, referring to FIG. 4, the system 400 can be similar to that of leak detection systems 200 and 300. For brevity, the description of common elements that have been described above are not repeated. Leak detection system 450 can additionally include a bypass line 257 fluidly connecting the first housing 253a and the second housing 253b such that first detection volume 251a and the second detection volume 251b are fluidly connected. In certain embodiments, pressure sensor 255a can be a single pressure sensor 255a detection volume 251a and 251b.

Figure 5:
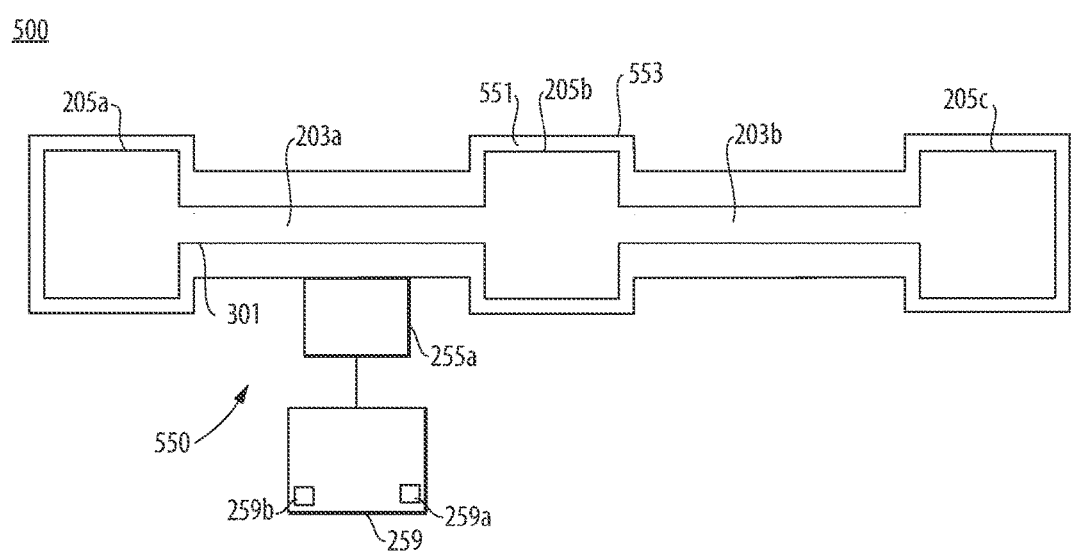
FIG. 5 is a schematic diagram of an embodiment of a system in accordance with this disclosure.

In certain embodiments, e.g., as shown in the system 500 of FIG. 5 the system 500 can be similar to that of leak detection systems 200, 300, and 400. For brevity, the description of common elements that have been described above are not repeated. Leak detection system 550 can include a single housing 553 that surrounds fluid system components 205a, 205b, 205c of the fluid conduit 301. In certain embodiments, e.g., as shown in FIG. 5, the single housing 553 surrounds all primary fluid system components 205a, 205b, 205c and all fluid lines 203a, 203b. In certain embodiments, the pressure sensor 255a can be a single pressure sensor 255a for the detection volume 551.

Any suitable number of housings and detection volumes is contemplated herein. Any suitable portion(s) of the primary fluid line (e.g., pipes and or components) can be covered by any suitable number of housings and detection volumes.

In accordance with at least one aspect of this disclosure, an aircraft engine includes one or more fuel components having a primary fluid line that conveys a primary fluid. In certain embodiments, the primary fluid is fuel. The aircraft engine can include a fluid system as disclosed herein (e.g., as described above) and a leak detection system (e.g., 250, 350, 450, 550) as disclosed herein (e.g., as described above). Any other suitable engine components are contemplated herein.

In accordance with at least one aspect of this disclosure, a fluid system (e.g. 200, 300, 400, 500) of an aircraft 1 includes a fluid conduit 201 that conveys a primary fluid (e.g. hydrogen fuel), a housing 253a disposed around at least a portion of the primary fluid conduit 201 and forming a detection volume 251a, a pressure sensor 255a disposed in operative communication with the housing 253a to sense a pressure within the detection volume 251a, and a control system 259 operatively connected to the pressure sensor 255a to determine whether there is a primary fluid leak between the fluid conduit 201 and the detection volume 251a based on pressure signals from the pressure sensor 255a. Any other suitable fluid system components are contemplated herein.

Figure 6:
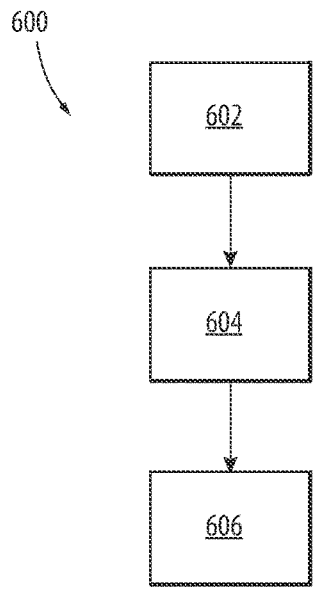
FIG. 6 is a flow diagram of an embodiment of a method in accordance with this disclosure.
Figure 7:
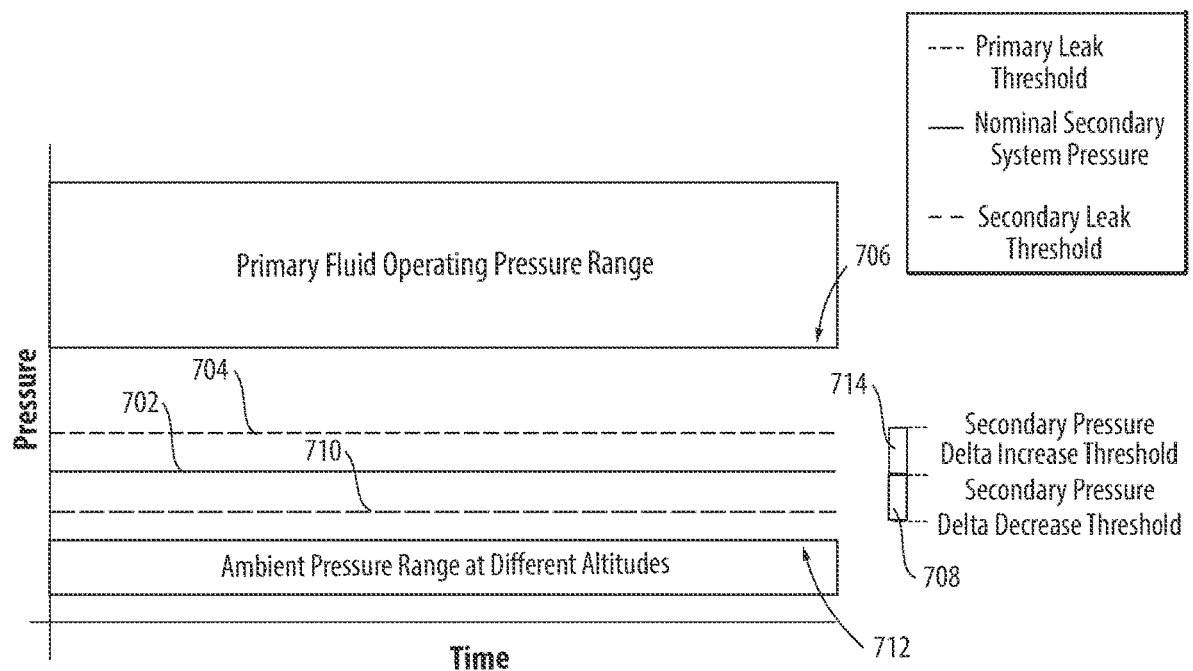
FIG. 7 is a chart showing an embodiment of pressure thresholds relative to a nominal secondary pressure in accordance with this disclosure.

As shown in FIG. 6, and with additional reference to FIGS. 7-10, in certain embodiments, a method 600 can include determining or receiving (e.g., at block 601) a detection volume pressure 702 based on the signals from the pressure sensors 255a, 255b. The method 600 can also include comparing (e.g., at block 603) the detection volume pressure 702 to a primary leak threshold 704 (e.g., as shown in FIG. 7). The method 600 can also include outputting (e.g., at block 605) a primary fluid leak signal to indicate a primary fluid leak of a primary fluid between a primary fluid path and the detection volume 251a if the detection volume pressure 702 exceeds the primary leak threshold 704 (e.g., as shown in the primary leak example of FIG. 8). Different detection volumes can include different pressure thresholds than that shown in FIG. 8. Any suitable pressure thresholds, the same or different, among isolated detection volumes is contemplated herein.

Figure 9:
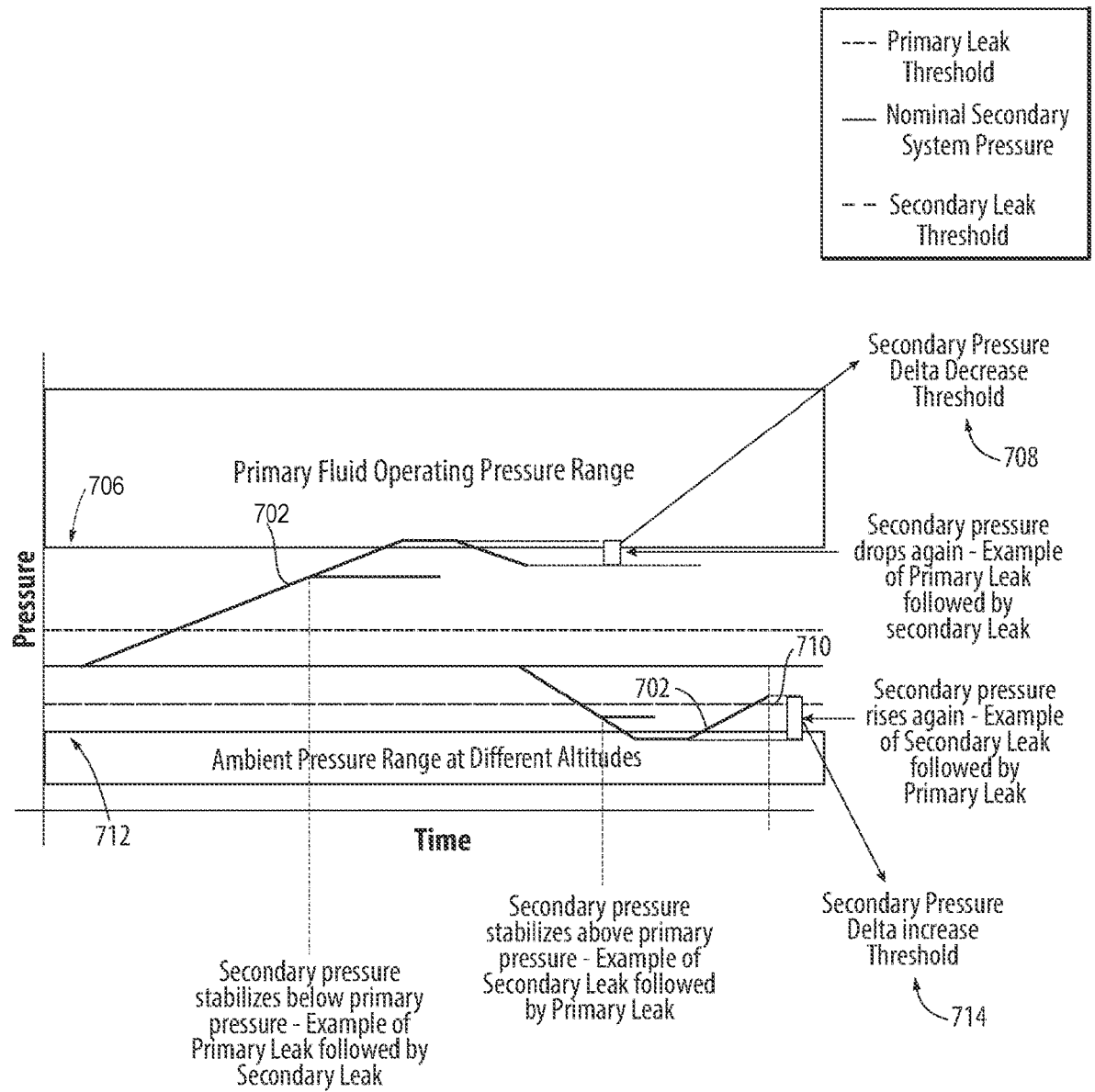
FIG. 9 is the chart of FIG. 7, showing an example of pressure readings that can indicate a primary fluid leak followed by a secondary fluid leak (left of chart), and separately a secondary fluid leak followed by a primary fluid leak (right of chart)

In certain embodiments, the method can further include monitoring the detection volume pressure 702 after crossing the primary fluid leak threshold 704, and outputting a dual primary-secondary fluid leak signal (e.g., individual signals indicating individual leaks, or a single signal indicating both types of leaks) indicating a secondary fluid leak in addition to the primary fluid leak if the detection volume pressure 702 stabilizes below a primary fluid pressure threshold 704 (e.g., as indicated in FIG. 9 where the secondary pressure 702 stabilizes below the primary pressure 706). In certain embodiments, the method further includes monitoring the detection volume pressure 702 after crossing the primary fluid leak threshold 704, and outputting a dual primary-secondary fluid leak signal indicating a secondary fluid leak in addition to the primary fluid leak if the detection volume pressure 702 decreases after crossing the primary fluid leak threshold 704 (e.g., as indicated in FIG. 9 where there the pressure drops after stabilizing). In certain embodiments, the method further includes monitoring the detection volume pressure 702 after crossing the primary fluid leak threshold 704, and outputting a dual primary-secondary fluid leak signal indicating a secondary fluid leak in addition to the primary fluid leak if the detection volume 702 pressure stabilizes above a primary fluid pressure threshold 704, and subsequently decreases below the primary fluid pressure threshold 704 (e.g., as indicated in FIG. 9 where the secondary pressure 702 stabilizes in the primary fluid operating pressure range and then decreases more than the optional secondary pressure delta threshold 708).

Figure 8:
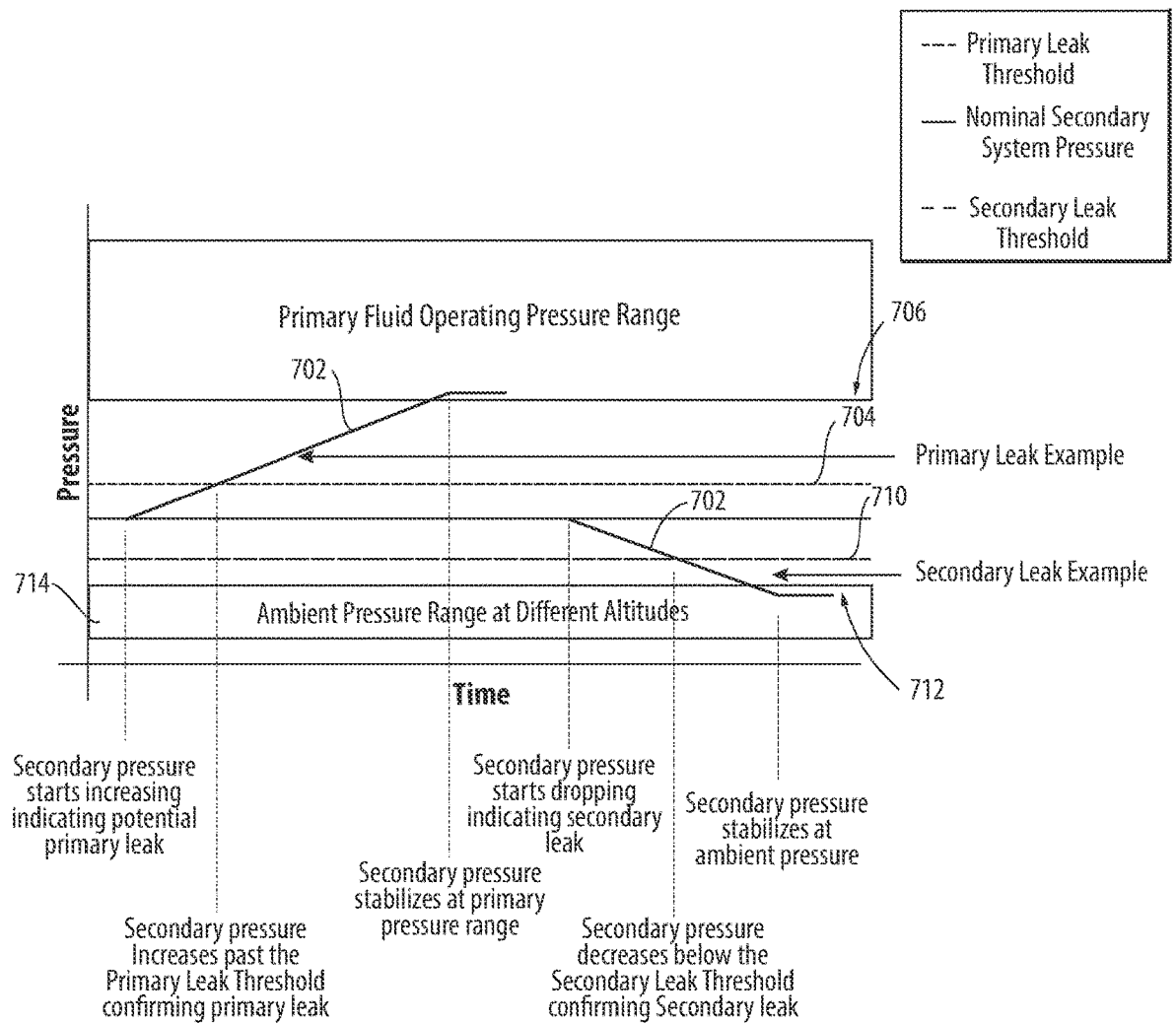
FIG. 8 is the chart of FIG. 7, showing an example of pressure readings that can indicate a primary fluid leak only (left of chart) and separately a secondary fluid leak only (right of chart)

In certain embodiments, the method further includes comparing the detection volume pressure 702 to a secondary leak threshold 710, and outputting a secondary fluid leak signal to indicate a secondary fluid leak between the detection volume 251a and an atmosphere if the detection volume pressure 702 declines below the secondary leak threshold 710 (e.g., indicated in FIG. 8). In certain embodiments, the method further includes monitoring the detection volume pressure 702 after crossing the secondary fluid leak threshold 710, and outputting a dual primary-secondary fluid leak signal (e.g., as disclosed above) indicating a primary fluid leak in addition to the secondary fluid leak if the detection volume pressure stabilizes above an atmosphere pressure threshold 712 (e.g., as indicated in FIG. 9).

In certain embodiments, the method further includes monitoring the detection volume pressure after crossing the secondary fluid leak threshold 710, and outputting a dual primary-secondary fluid leak signal indicating a primary fluid leak in addition to the secondary fluid leak if the detection volume pressure 702 increases after crossing the secondary fluid leak threshold 710 (e.g., as shown in FIG. 9 where pressure increases after stabilizing in the ambient pressure range). In certain embodiments, the method further includes monitoring the detection volume pressure 702 after crossing the secondary fluid leak threshold, and outputting a dual primary-secondary fluid leak signal indicating a primary fluid leak in addition to the secondary fluid leak if the detection volume pressure 702 stabilizes below an atmosphere pressure threshold 712, and subsequently increases above the atmosphere pressure threshold 712 (e.g., as shown in FIG. 9 where pressure increases above a secondary pressure delta 714 for the secondary leak, e.g., bottom right of FIG. 9).

Any suitable action can be taken in response to an output primary fluid leak signal, a secondary fluid leak signal, or a dual primary-secondary fluid leak signal. For example, in certain embodiments, the control system 259 can continue to flow primary fluid through the primary fluid conduit if only a single leak is detected, but to shut down the flow of primary fluid if both leaks are detected.

In accordance with at least one aspect of this disclosure, a method for detecting a leak in a fuel system can include determining or receiving a detection volume pressure based on signals from one or more pressure sensors, comparing the detection volume pressure to a primary fluid leak threshold, and outputting a primary fluid leak signal to indicate a primary fluid leak of a primary fluid between a primary fluid path and the detection volume if the detection volume pressure exceeds the primary leak threshold. In certain embodiments, the method further includes monitoring the detection volume pressure after crossing the primary fluid leak threshold, and outputting a dual primary-secondary fluid leak signal indicating a secondary fluid leak in addition to the primary fluid leak if the detection volume pressure stabilizes below a primary fluid pressure threshold.

Figure 10:
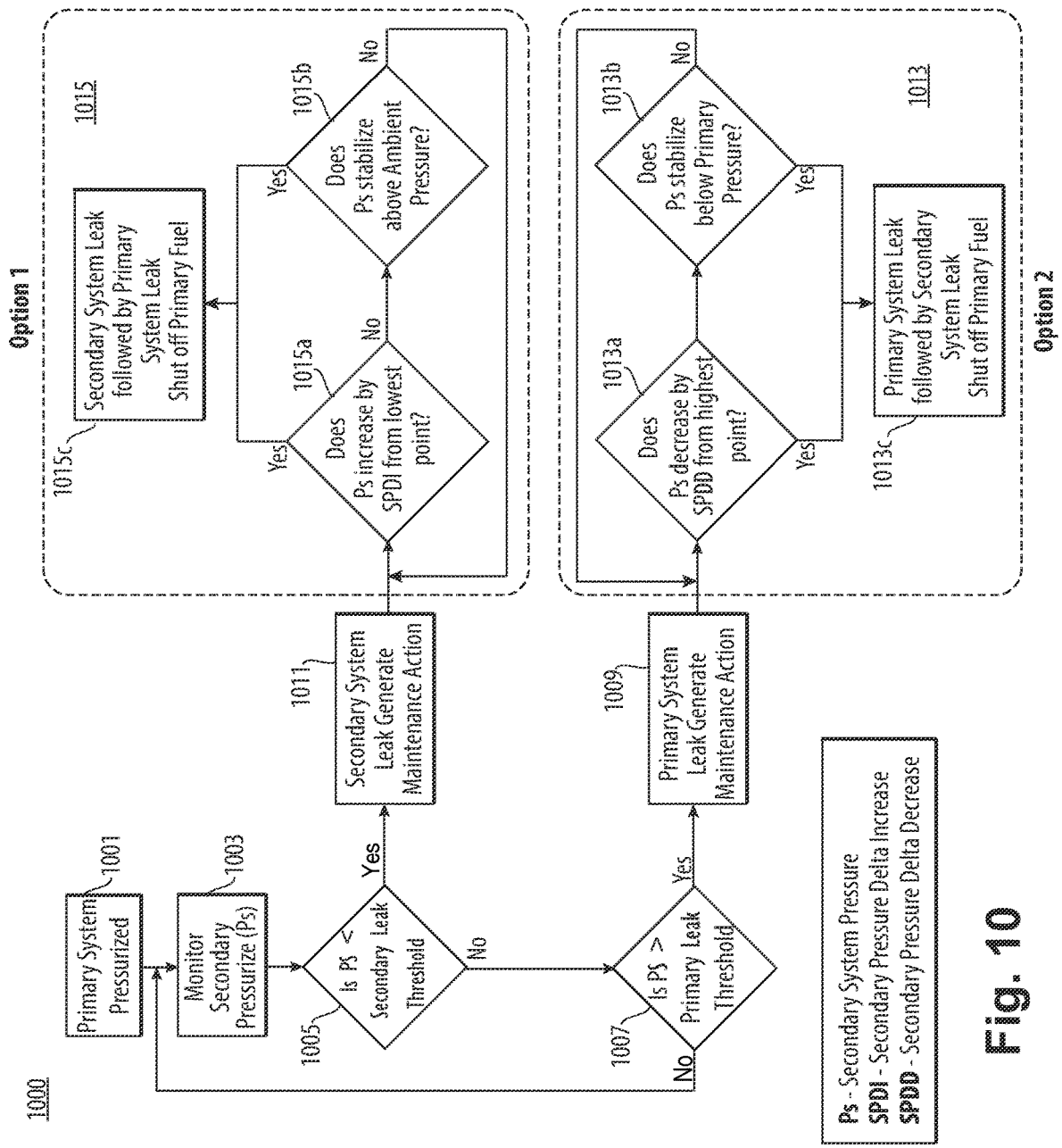
FIG. 10 is flow diagram of an embodiment of a method in accordance with this disclosure.

In accordance with at least one aspect of this disclosure, referring to FIG. 10, a method 1000 for leak detection of a fluid system includes pressurizing (e.g., at block 1001) a primary fluid system to a primary fluid pressure, monitoring a detection volume pressure different from the primary fluid pressure (e.g., at block 1003), and if the detection volume pressure increases above a primary fluid leak threshold (e.g., as determined at decision block 1007), outputting (e.g., at block 1009) a primary fluid leak signal. In certain embodiments, if the detection volume pressure decreases below a secondary fluid leak threshold (e.g., as determined at decision block 1005), the method 1000 can include outputting (e.g., at block 1011) a secondary fluid leak signal. In certain embodiments, the method 1000 further includes activating a maintenance indicator (e.g., generating a maintenance action) in response to the primary fluid leak signal alone or the secondary fluid leak signal alone. In certain embodiments, the primary fluid system may continue to function (e.g., if a fuel system, allowing the engine to continue to operate) while notifying a user (e.g., a pilot) that there is a primary or secondary leak and maintenance action is needed.

In certain embodiments, the method 1000 further includes monitoring (e.g., within block 1013) the detection volume pressure after outputting the primary fluid leak signal (e.g., at block 1009), and if the detection volume pressure decreases from a highest point (e.g., as determined at decision block 1013a), determining a dual secondary fluid leak also exists and shutting down the primary fluid system (e.g., at block 1013c). In certain embodiments, the method 1000 further includes monitoring (e.g., within block 1013) the detection volume pressure after outputting the primary fluid leak signal, and if the detection volume pressure stabilizes below a primary fluid pressure threshold (e.g., as determined at block 1013b), determining a secondary fluid leak also exists and shutting down the primary fluid system (e.g., at block 1013c). As shown, if either condition is true within block 1013 (which lead to the determination that both leak types are present), the primary flow can be shut down (e.g., shutting down an engine as a result). As shown, there can be a delta to provide hysteresis to prevent false determinations due to error, for example.

In certain embodiments, the method 1000 further includes monitoring (e.g., within block 1015 the detection volume pressure after outputting the secondary fluid leak signal, and if the detection volume pressure increases from a lowest point (e.g., as determined at block 1015a), determining a primary fluid leak also exists and shutting down the primary fluid system (e.g., at block 1015c). In certain embodiments, the method 1000 further includes monitoring (e.g., within block 1015) the detection volume pressure after outputting the secondary fluid leak signal (e.g., at block 1011), and if the detection volume pressure stabilizes above an atmosphere pressure threshold (e.g., as determined at block 1015b), determining a dual primary-secondary fluid leak exists and shutting down the primary fluid system (e.g., at block 1015c). As shown, if either condition is true within 1013b (which lead to the determination that both leak types are present), the primary flow can be shut down (e.g., shutting down an engine as a result). As shown, there can be a delta to provide hysteresis to prevent false determinations due to error, for example.

In certain embodiments, the fluid system is a fuel system. In certain embodiments, the fuel system is a hydrogen fuel system for an aircraft. Any other suitable fluid system or fuel type system is contemplated herein.

Embodiments include a secondary system with a pressurized gas or other fluid. With a sealed secondary system, the detection volume can be statically pressurized and the pressure can be monitored for changes to indicate a leak in the primary or secondary system. Any suitable structure is suitable for sealing (e.g., having one or more face seals or other sealing interfaces). Embodiments can have a check valve where one can inject pressurized air or inert gas (e.g., N2), which can allow repressurizing after losing pressure (e.g., if you need to access to primary fluid line).

In certain embodiments, secondary pressure will be less than primary fluid pressure (e.g., which can be at about 650 psi to about 950 psi for hydrogen systems), and higher than the ambient pressure to detect a leak from the secondary fluid into the ambient atmosphere. In certain embodiments, the secondary pressure can be about 25 psi to about 500 psi. Any suitable pressure for the secondary fluid is contemplated herein (e.g., 50 psi, 300 psi, etc.). In certain embodiments, the housing of the leak detection system can be designed to withstand the pressure of the primary fluid, for example to contain a hydrogen leak, e.g., for at least an emergency period of time.

Embodiments can include a pressure sensor that can be in fluid communication with the detection volume. Embodiments can have a pressure sensor for each zone, and can allow accurate determination of where the leak is. In certain embodiments static pressure is shared by two or more detection volumes via a bypass around component in certain embodiments allowing use of a single pressure sensor if desired. In certain embodiments, everything (lines, components) is enclosed within a detection volume.

Embodiments can include a control system having one or more modules. The control system can be part of an engine controller (EEC) or any other suitable aircraft controller, for example. Any other suitable delineation or location is contemplated herein.

Embodiments can include a secondary jacket or line surrounding a primary fluid/fuel (H2 in this case) carrying line that is intended to contain leakage from the primary line or system. The primary lines can be connected between components carrying or using the primary fluid such as fuel tank, regulator, accessories, pumps, metering valves, sensors etc. In certain embodiments, the secondary fluid system can be sealed at all interfaces and is not vented. In certain embodiments, the secondary fluid system can be pressurized to a pressure higher than ambient but lower than the primary fuel pressure. As a non-limiting example, if the primary fluid pressure is between 100 psig and 200 psig, the secondary system can be pressurized to 30 psig. A pressure detector can be installed on the secondary system to detect pressure change. Changes in pressure can indicate leakage.

In certain embodiments, the one or more housings can include a tube fitting for fitting the secondary system to the primary components can be similar to the one described in U.S. patent application Ser. No. 17/246,382, filed Apr. 30, 2021, incorporated by reference herein, except that the connector does not need to contain a "T" for the air vent bridge tube, since no venting is necessary. In certain embodiments, the sealing faces to the secondary line and to the component can be a threaded interface.

Embodiments can include multiple secondary housings and multiple pressure sensors. The secondary system may be arranged such that each primary line has an independent secondary housing such that the secondary housings are not connected. Embodiments can include a multiple pressure sensor arrangement where each secondary system may have different pressure thresholds since the primary pressures may be different from one line to another. In such a system, each secondary line may have a separate pressure sensor. Different thresholds may translate into better detection accuracy. In the case of a leak, this arrangement makes it easy to identify which line is leaking since all the secondary lines are independent.

Certain embodiments can have a single pressure sensor and a bypass connecting a plurality of detection volumes. In such arrangements, multiple or all secondary housings can be connected together through bypass connections that connect adjacent secondary housings around the primary fluid components allowing for a single pressure transducer to detect leakage, which is cost effective.

Certain embodiments can include a single pressure sensor and container. The secondary system can be arranged to completely enclose the primary lines and components. Such arrangements may be most practical if the primary components are small and don't have other interfaces such as electrical connectors. However, any suitable application is contemplated herein.

Embodiments can include a secondary line surrounding a primary line that is sealing the primary line and all the primary line interfaces with adjacent components. In certain embodiments, the primary line carries fluid between two or more components. In certain embodiments, the area between the primary and secondary line is sealed and pressurized with a secondary fluid (may be air) to a pressure higher than ambient air (at all operating altitudes) and lower than the operating pressure range of the primary fluid. In certain embodiments, a pressure sensor is connected to the secondary system to measure the secondary pressure and determine if there is a leak on the primary, secondary or on both systems. In certain embodiments, a single pressure sensor and multiple secondary systems can all be connected via secondary bypass lines. In certain embodiments, multiple secondary systems can be connected to multiple pressure sensors, each system under different secondary pressure. In certain embodiments, a secondary system completely encloses all primary lines and components with a single pressure sensor on the entire secondary system.

Embodiments of this disclosure can address the potential of hydrogen leakage from multiple locations (fittings and connections between hydrogen lines and hydrogen accessories) on a Hydrogen engine, for example. Any other suitable use is contemplated herein. Embodiments can utilize a double jacketed lines with provision for leak protection at the interfaces, in addition to pressurizing the secondary system and having a pressure detection incorporated for leak detection.

During operation (i.e., primary system is pressurized), if the pressure of the secondary system drops below the secondary leak threshold (e.g., 30 psig and some negative margin e.g., about 25 psig), it can indicate that the secondary system has a leak to the outside. At this point, the control system may flag a maintenance action that should be taken to replace the leaking secondary system since it acts as a leak protection of the primary system. If, following the secondary system pressure drop below the secondary leak threshold, the pressure either increases by a value (Secondary Pressure Delta Increase) or stabilizes above ambient pressure, then this indicates that the primary system is also leaking. At this point, the control system may elect to shut down the fuel flow.

For detecting a primary leak, if the pressure of the secondary system increases above the primary leak threshold (e.g., 30 psig and some margin, e.g., about 35 psig), it indicates that there is a leak of the primary fuel into the secondary system. If the secondary system was leak free prior to the primary leak detection, then the control system may allow the pilot to continue flight and flag a maintenance action. If, following the secondary system pressure rise above the primary leak threshold, the pressure either decreases by a value (Secondary Pressure Delta Decrease) or stabilizes below the primary fluid pressure, then this indicates that the secondary system is also leaking. At this point, the control system may elect to shut down the fuel flow.

If, following the secondary system pressure drop below the secondary leak threshold, the pressure stabilizes above ambient pressure, then this indicates that the primary system is also leaking or that the secondary leak has stopped. At this point, the control system may elect to continue pressurizing the primary system (i.e. keep running the engine) and continue monitoring the secondary pressure.

If, following the secondary system pressure increase above the primary leak threshold, the pressure stabilizes below the primary fluid pressure, then this indicates that the secondary system is also leaking or that the primary leak has stopped. At this point, the control system may elect to continue pressurizing the primary system (i.e. keep running the engine) and continue monitoring the secondary pressure.

Embodiments can provide monitoring the pressurized volume of fluid between a primary fluid carrying line and a secondary line, which is sealing the primary line along its length and interfaces. At no leak conditions, the secondary fluid pressure is between ambient air and the operating pressure of the primary fluid. During normal operation, if the secondary pressure rises above a first threshold, it indicates that the primary fluid is leaking into the secondary line. During normal operation, if the secondary pressure drops below a second threshold, it indicates that the secondary system is leaking. If after rising above first threshold, the secondary pressure drops by a certain amount or stabilizes below the primary pressure, it may indicate that the primary system started leaking first followed by a leak on the secondary. Primary fluid shutoff may be required. If after dropping below the second threshold, the secondary pressure rises by a certain amount or stabilizes above ambient, it may indicate that the secondary system started leaking first followed by a leak on the secondary. Primary fluid shutoff may be required.

While the apparatus and methods of the subject disclosure have been shown and described, those skilled in the art will readily appreciate that changes and/or modifications may be made thereto without departing from the scope of the subject disclosure.

For example, the following particular embodiments of the present technology are likewise contemplated, as described herein next by clauses.

Clause 1. A fluid system (100, 200, 300, 400, or 500) of an aircraft (1), comprising:
- a primary fluid conduit (201) that conveys a primary fluid; and
- a leak detection system (250, 350, 450, 550) disposed around at least a portion of the primary fluid conduit and forming one or more detection volumes (251), wherein the leak detection system determines whether there is a primary fluid leak into the one or more detection volumes by sensing a pressure change in the one or more detection volumes.

Clause 2. The system of clause 1, wherein the leak detection system includes;
- one or more housings (253) defining the one or more detection volumes; and
- one or more pressure sensors (255) operatively connected to the one or of the one or more housings to sense a pressure within a respective detection volume, within a plurality of detection volumes, or within all of the one or more detection volumes.

Clause 3. The system of clause 2, wherein the one or more detection volumes includes a first detection volume (251*a*), wherein the one or more housings include a first housing (253*a*) disposed around an interface of the fluid conduit.

Clause 4. The system of clause 3, wherein the first housing surrounds and entirety of a first primary fluid line (203*a*) of the primary fluid conduit between a first primary fluid system component (205*a*) and a second primary fluid system component (205*b*) to form a first detection volume (251*a*).

Clause 5. The system of clause 3, wherein the first housing is sealed to the first primary system component and to the second primary system component to encompass a first connection (207*a*) and second connection (207*b*) of the first primary fluid line within the one or more detection volumes.

Clause 6. The system of clause 3, wherein the one or more housings include a second housing (253*b*) disposed around a second primary fluid line (203*b*) of the primary fluid conduit between the second primary fluid system component and a third primary fluid system component (205*c*) to form a second detection volume (251*b*).

Clause 7. The system of clause 6, wherein the second housing is sealed to the second primary system component and to the third primary system component to encompass a first connection (207*c*) and second connection (207*d*) of the second primary fluid line (203*b*) within the one or more detection volumes.

Clause 8. The system of clause 6, wherein the first detection volume and the second detection volume are fluidly isolated from each other, wherein the one or more pressure sensors includes at least one pressure sensor for each detection volume.

Clause 9. The system of clause 6, further comprising a bypass line (257) fluidly connecting the first housing and the second housing such that first detection volume and the second detection volume are fluidly connected.

Clause 10. The system of clause 9, wherein the one or more pressure sensors is a single pressure sensor (255).

Clause 11. The system of clause 3, wherein the one or more housings include a single housing (253) that surrounds one or more primary fluid system components of the primary fluid conduit.

Clause 12. The system of clause 11, wherein the single housing surrounds all primary fluid system components and all primary fluid lines.

Clause 13. The system of clause 2, further comprising a control system (259) operatively connected to the one or more pressure sensors to determine whether there is a primary fluid leak based on pressure signals from the one or more pressure sensors.

Clause 14. The system of clause 1, wherein the fluid system is a fuel system (100) and the primary fluid is a fuel.

Clause 15. The system of clause 13, wherein the primary fluid is hydrogen.

Clause 16. The system of clause 1, further comprising a pressurized secondary fluid filling the one or more detection volume at a lower pressure than an operating pressure of the primary fluid in the primary line.

Clause 17. An aircraft (1), comprising:
- a fuel system (100, 200, 300, 400, 500), comprising:
  - a primary fluid conduit (201) that conveys a primary fluid, wherein the primary fluid is fuel; and
  - a leak detection system (250, 350, 450, 550) disposed around at least a portion of the primary fluid conduit and forming one or more detection volumes (251), wherein the leak detection system determines whether there is a primary fluid leak into the one or more detection volumes by sensing a pressure change in the one or more detection volumes.

Clause 18. The aircraft of clause 17, wherein the leak detection system includes;
one or more housings (253) defining the one or more detection volumes; and
one or more pressure sensors (255) disposed on the housing that sense a pressure within the one or more detection volumes.

Clause 19. The aircraft of clause 18, wherein the one or more housings include a first housing (253*a*) disposed around a first primary fluid line (203*a*) of the primary fluid conduit between a first primary fluid system component (205*a*) and a second primary fluid system component (205*b*) to form a first detection volume (251*a*).

Clause 20. A fluid system (100, 200, 300, 400, 500) of an aircraft (1), comprising:
a fluid conduit (201) that conveys a primary fluid, wherein the primary fluid is fuel;
a housing (253) disposed around at least a portion of the primary fluid conduit and forming a detection volume (251);
a pressure sensor (255) disposed in operative communication with the housing to sense a pressure within the detection volume; and
a control system (259) operatively connected to the pressure sensor to determine whether there is a primary fluid leak between the fluid conduit and the detection volume based on pressure signals from the pressure sensor.

Clause 21. A leak detection system (250, 350, 450, 550), comprising:
a leak detection module (259*a*) that operatively connects to one or more pressure sensors (255) to receive signals from the one or more pressure sensors that sense pressure in a detection volume (251), the leak detection module operable to execute a method, the method comprising:
determining or receiving a detection volume pressure based on the signals from the one or more pressure sensors;
comparing the detection volume pressure to a primary leak threshold (704); and
outputting a primary fluid leak signal to indicate a primary fluid leak of a primary fluid between a primary fluid path and the detection volume when the detection volume pressure exceeds the primary leak threshold.

Clause 22. The system of clause 21, wherein the method further includes:
monitoring the detection volume pressure (702) after crossing the primary fluid leak threshold; and
outputting a dual primary-secondary fluid leak signal indicating a secondary fluid leak in addition to the primary fluid leak if the detection volume pressure stabilizes below a primary fluid pressure threshold (706).

Clause 23. The system of clause 21, wherein the method further includes:
monitoring the detection volume pressure after crossing the primary fluid leak threshold; and
outputting a dual primary-secondary fluid leak signal indicating a secondary fluid leak in addition to the primary fluid leak if the detection volume pressure decreases after crossing the primary fluid leak threshold.

Clause 24. The system of clause 21, wherein the method further includes:
monitoring the detection volume pressure after crossing the primary fluid leak threshold; and
outputting a dual primary-secondary fluid leak signal indicating a secondary fluid leak in addition to the primary fluid leak if the detection volume pressure stabilizes above a primary fluid pressure threshold (706), and subsequently decreases below the primary fluid pressure threshold.

Clause 25. The system of clause 21, wherein the method further includes:
comparing the detection volume pressure to a secondary leak threshold (710); and
outputting a secondary fluid leak signal to indicate a secondary fluid leak between the detection volume and an atmosphere if the detection volume pressure declines below the secondary leak threshold.

Clause 26. The system of clause 25, wherein the method further includes:
monitoring the detection volume pressure after crossing the secondary fluid leak threshold; and
outputting a dual primary-secondary fluid leak signal indicating a primary fluid leak in addition to the secondary fluid leak if the detection volume pressure stabilizes above an atmosphere pressure threshold (712).

Clause 27. The system of clause 25, wherein the method further includes:
monitoring the detection volume pressure after crossing the secondary fluid leak threshold; and
outputting a dual primary-secondary fluid leak signal indicating a primary fluid leak in addition to the secondary fluid leak if the detection volume pressure increases after crossing the secondary fluid leak threshold.

Clause 28. The system of clause 25, wherein the method further includes:
monitoring the detection volume pressure after crossing the secondary fluid leak threshold; and
outputting a dual primary-secondary fluid leak signal indicating a primary fluid leak in addition to the secondary fluid leak if the detection volume pressure stabilizes below an atmosphere pressure threshold (712), and subsequently increases above the atmosphere pressure threshold.

Clause 29. The system of clause 21, further comprising an engine control module (259*b*) that controls an engine (10) based on signals received from the leak detection module.

Clause 30. The system of clause 29, wherein the engine control module shutdowns the engine and/or a fuel system (100, 200, 300, 400, 500) thereof if a dual primary-secondary fluid leak is detected.

Clause 31. A method for detecting a leak in a fuel system (100, 200, 300, 400, 500), comprising:
determining or receiving a detection volume pressure (702) based on signals from one or more pressure sensors (255);
comparing the detection volume pressure to a primary fluid leak threshold (704); and
outputting a primary fluid leak signal to indicate a primary fluid leak of a primary fluid between a primary fluid path and the detection volume if the detection volume pressure exceeds the primary leak threshold.

Clause 32. The method of clause 31, further comprising:

monitoring the detection volume pressure after crossing the primary fluid leak threshold; and outputting a dual primary-secondary fluid leak signal indicating a secondary fluid leak in addition to the primary fluid leak if the detection volume pressure stabilizes below a primary fluid pressure threshold (706).

Clause 33. A method for leak detection of a fluid system (100, 200, 300, 400, 500), comprising:

pressurizing a primary fluid system to a primary fluid pressure (706);

monitoring a detection volume pressure (702) different from the primary fluid pressure; and wherein if the detection volume pressure increases above a primary fluid leak threshold (704), outputting a primary fluid leak signal, and wherein if the detection volume pressure decreases below a secondary fluid leak threshold (710), outputting a secondary fluid leak signal.

Clause 34. The method of clause 33, further comprising activating a maintenance indicator in response to the primary fluid leak signal alone or the secondary fluid leak signal alone.

Clause 35. The method of clause 34, further comprising:

monitoring the detection volume pressure after outputting the primary fluid leak signal; and wherein if the detection volume pressure decreases from a highest point, determining a dual secondary fluid leak also exists and shutting down the primary fluid system.

Clause 36. The method of clause 34, further comprising:

monitoring the detection volume pressure after outputting the primary fluid leak signal; and wherein if the detection volume pressure stabilized below a primary fluid pressure threshold (706), determining a secondary fluid leak also exists and shutting down the primary fluid system.

Clause 37. The method of clause 34, further comprising:

monitoring the detection volume pressure after outputting the secondary fluid leak signal; and wherein if the detection volume pressure increases from a lowest point, determining a primary fluid leak also exists and shutting down the primary fluid system.

Clause 38. The method of clause 34, further comprising:

monitoring the detection volume pressure after outputting the secondary fluid leak signal; and wherein if the detection volume pressure stabilizes above an atmosphere pressure threshold (712), determining a dual primary-secondary fluid leak exists and shutting down the primary fluid system.

Clause 39. The method of clause 33, wherein the fluid system is a fuel system.

Clause 40. The method of clause 33, wherein the fuel system is a hydrogen fuel system for an aircraft (1).

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A leak detection system, comprising:
   a leak detection module that operatively connects to one or more pressure sensors to receive signals from the one or more pressure sensors that sense pressure in a detection volume, the leak detection module operable to execute a method, the method comprising:
   determining or receiving a detection volume pressure based on the signals from the one or more pressure sensors;
   comparing the detection volume pressure to a primary leak threshold;
   outputting a primary fluid leak signal to indicate a primary fluid leak of a primary fluid between a primary fluid path and the detection volume when the detection volume pressure exceeds the primary leak threshold;
   monitoring the detection volume pressure after crossing the primary fluid leak threshold; and
   in response to a change in the detection volume pressure, outputting a dual primary-secondary fluid leak signal indicating a secondary fluid leak in addition to the primary fluid leak.

2. The system of claim 1, wherein the method further includes:
   outputting the dual primary-secondary fluid leak signal if the detection volume pressure stabilizes below a primary fluid pressure threshold.

3. The system of claim 1, wherein the method further includes:
   outputting the dual primary-secondary fluid leak signal if the detection volume pressure decreases after crossing the primary fluid leak threshold.

4. The system of claim 1, wherein the method further includes:
   outputting the dual primary-secondary fluid leak signal if the detection volume pressure stabilizes above a primary fluid pressure threshold, and subsequently decreases below the primary fluid pressure threshold.

5. The system of claim 1, wherein the method further includes:
   comparing the detection volume pressure to a secondary leak threshold; and
   outputting the secondary fluid leak signal to indicate the secondary fluid leak between the detection volume and an atmosphere if the detection volume pressure declines below the secondary leak threshold.

6. The system of claim 5, wherein the method further includes:
   monitoring the detection volume pressure after crossing the secondary fluid leak threshold; and
   outputting the dual primary-secondary fluid leak signal if the detection volume pressure stabilizes above an atmosphere pressure threshold.

7. The system of claim 5, wherein the method further includes:
 monitoring the detection volume pressure after crossing the secondary fluid leak threshold; and
 outputting the dual primary-secondary fluid leak signal if the detection volume pressure increases after crossing the secondary fluid leak threshold.

8. The system of claim 5, wherein the method further includes:
 monitoring the detection volume pressure after crossing the secondary fluid leak threshold; and
 outputting the dual primary-secondary fluid leak signal if the detection volume pressure stabilizes below an atmosphere pressure threshold, and subsequently increases above the atmosphere pressure threshold.

9. The system of claim 1, further comprising an engine control module that controls an engine based on signals received from the leak detection module.

10. The system of claim 9, wherein the engine control module shutdowns the engine and/or a fuel system thereof if a dual primary-secondary fluid leak is detected.

11. A method for detecting a leak in a fuel system, comprising:
 determining or receiving a detection volume pressure based on signals from one or more pressure sensors;
 comparing the detection volume pressure to a primary fluid leak threshold;
 outputting a primary fluid leak signal to indicate a primary fluid leak of a primary fluid between a primary fluid path and the detection volume if the detection volume pressure exceeds the primary leak threshold;
 monitoring the detection volume pressure after crossing the primary fluid leak threshold; and
 in response to a change in the detection volume pressure, outputting a dual primary-secondary fluid leak signal indicating a secondary fluid leak in addition to the primary fluid leak.

12. The method of claim 11, further comprising:
 outputting the dual primary-secondary fluid leak signal if the detection volume pressure stabilizes below a primary fluid pressure threshold.

13. A method for leak detection of a fluid system, comprising:
 pressurizing a primary fluid system to a primary fluid pressure;
 monitoring a detection volume pressure different from the primary fluid pressure;
 wherein if the detection volume pressure increases above a primary fluid leak threshold, outputting a primary fluid leak signal;
 monitoring the detection volume pressure after outputting the primary fluid leak signal; and
 in response to a decrease in the detection volume pressure below a secondary fluid leak threshold, determining a secondary fluid leak also exists and outputting a second fluid leak signal.

14. The method of claim 13, further comprising activating a maintenance indicator in response to the primary fluid leak signal alone or the secondary fluid leak signal alone.

15. The method of claim 13, further comprising:
 in response to receiving both a primary fluid leak signal and a secondary fluid leak signal, shutting down the primary fluid system.

16. The method of claim 13, further comprising:
 wherein if the detection volume pressure stabilizes below a primary fluid pressure threshold, shutting down the primary fluid system.

17. The method of claim 13, further comprising:
 wherein if the detection volume pressure increases from a lowest point, shutting down the primary fluid system.

18. The method of claim 13, further comprising:
 wherein if the detection volume pressure stabilizes above an atmosphere pressure threshold, determining a dual primary-secondary fluid leak exists and shutting down the primary fluid system.

19. The method of claim 13, wherein the fluid system is a fuel system.

20. The method of claim 13, wherein the fuel system is a hydrogen fuel system for an aircraft.

* * * * *